United States Patent
Li

(10) Patent No.: US 8,242,743 B2
(45) Date of Patent: Aug. 14, 2012

(54) MOUSE WITH BATTERY CHAMBER AND BATTERY CHARGING CIRCUIT

(75) Inventor: Jian-Hui Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 398 days.

(21) Appl. No.: 12/644,106

(22) Filed: Dec. 22, 2009

(65) Prior Publication Data

US 2011/0006732 A1   Jan. 13, 2011

(30) Foreign Application Priority Data

Jul. 8, 2009  (CN) .......................... 2009 1 0304140

(51) Int. Cl.
*H01M 10/46* (2006.01)

(52) U.S. Cl. ..................................................... 320/114

(58) Field of Classification Search ............... 320/107, 320/114, 115, 132; D14/402, 405
See application file for complete search history.

(56) References Cited

U.S. PATENT DOCUMENTS

| | | | | |
|---|---|---|---|---|
| 6,433,508 B1 * | 8/2002 | Yang | ............... | 320/103 |
| 6,498,458 B1 * | 12/2002 | Chen | ............... | 320/114 |
| 2006/0202660 A1 * | 9/2006 | Chang | ............... | 320/115 |
| 2008/0180057 A1 * | 7/2008 | Watanabe | ............... | 320/103 |
| 2008/0311765 A1 * | 12/2008 | Chatterjee et al. | ............ | 320/137 |

* cited by examiner

*Primary Examiner* — Edward Tso
(74) *Attorney, Agent, or Firm* — Altis Law Group, Inc.

(57) ABSTRACT

A mouse includes a housing, a circuit board received in the housing, and a battery chamber received in the housing and configured for receiving a battery therein. The circuit board includes a USB mouse operating circuit, a charging circuit and a USB connector. The USB mouse operating circuit and the charging circuit are both connected to the USB connector. The battery chamber includes at least one charging connector connected to the charging circuit. The charging connector connects the charging circuit with the battery received in the battery chamber.

14 Claims, 5 Drawing Sheets

MOUSE WITH BATTERY CHAMBER AND BATTERY CHARGING CIRCUIT

BACKGROUND

1. Technical Field

The present disclosure relates to mice, and particularly to a multifunctional mouse.

2. Description of Related Art

Universal Serial Bus (USB) interfaces are widely used in computers. When a portable electronic device such as a digital camera or an MP3/MP4 player is connected to a computer by a USB interface, the portable electronic device and the computer can transmit data to each other by the USB interface. Furthermore, the computer can also charge the battery of the portable electronic device by the USB interface.

Mice are often used to operate computers. Nowadays, many mice can also be connected to computers by USB interfaces. Generally, when a mouse is connected to a USB interface, the USB interface cannot be used to charge a battery.

Therefore, there is room for improvement within the art.

BRIEF DESCRIPTION OF THE DRAWINGS

Many aspects of the present mouse can be better understood with reference to the following drawings. The components in the various drawings are not necessarily drawn to scale, the emphasis instead being placed upon clearly illustrating the principles of the present mouse. Moreover, in the drawings, like reference numerals designate corresponding parts throughout the figures.

DETAILED DESCRIPTION

Figure 1:
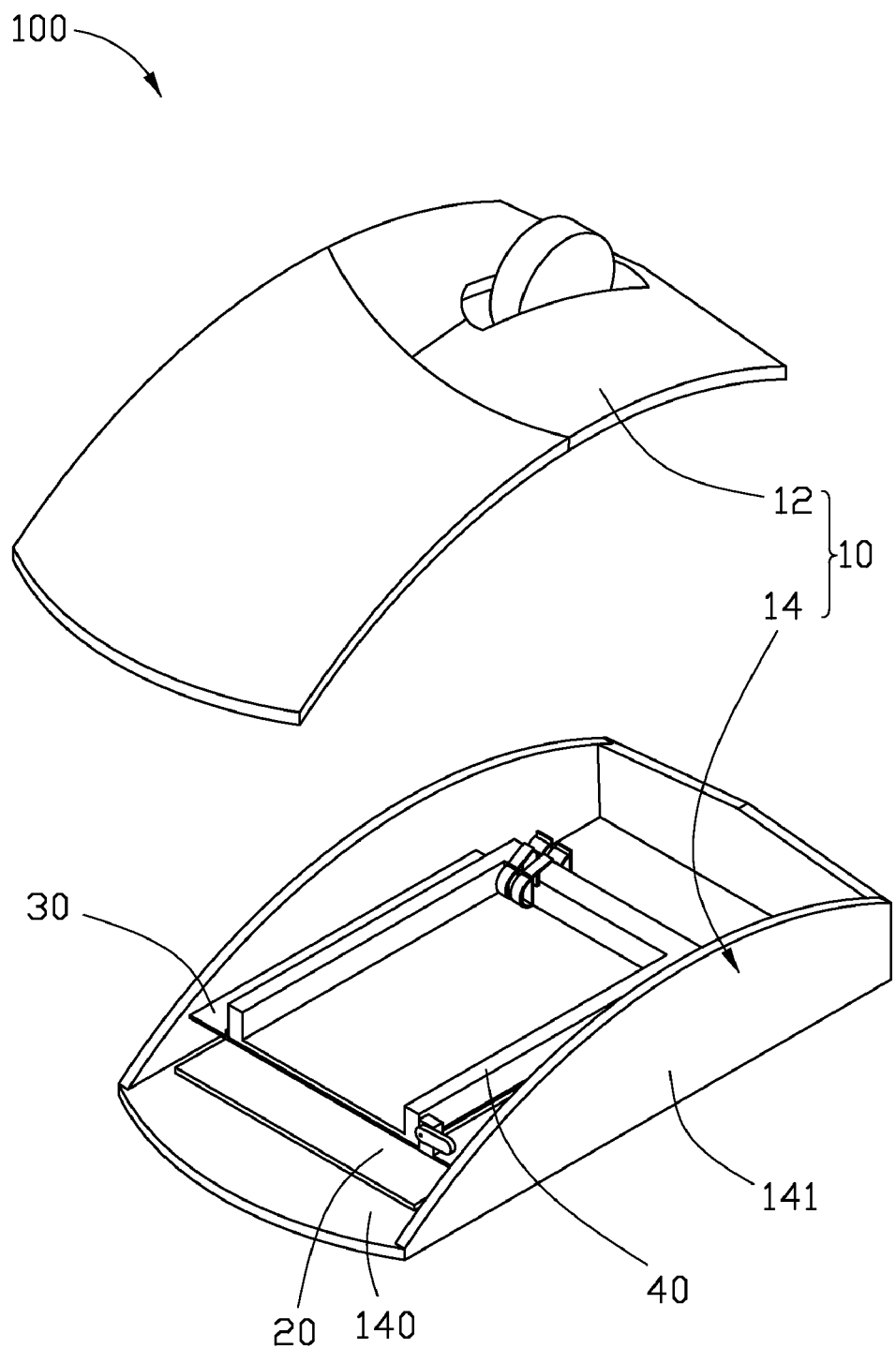
FIG. 1 is a disassembled view of a mouse, according to a first exemplary embodiment.
Figure 2:
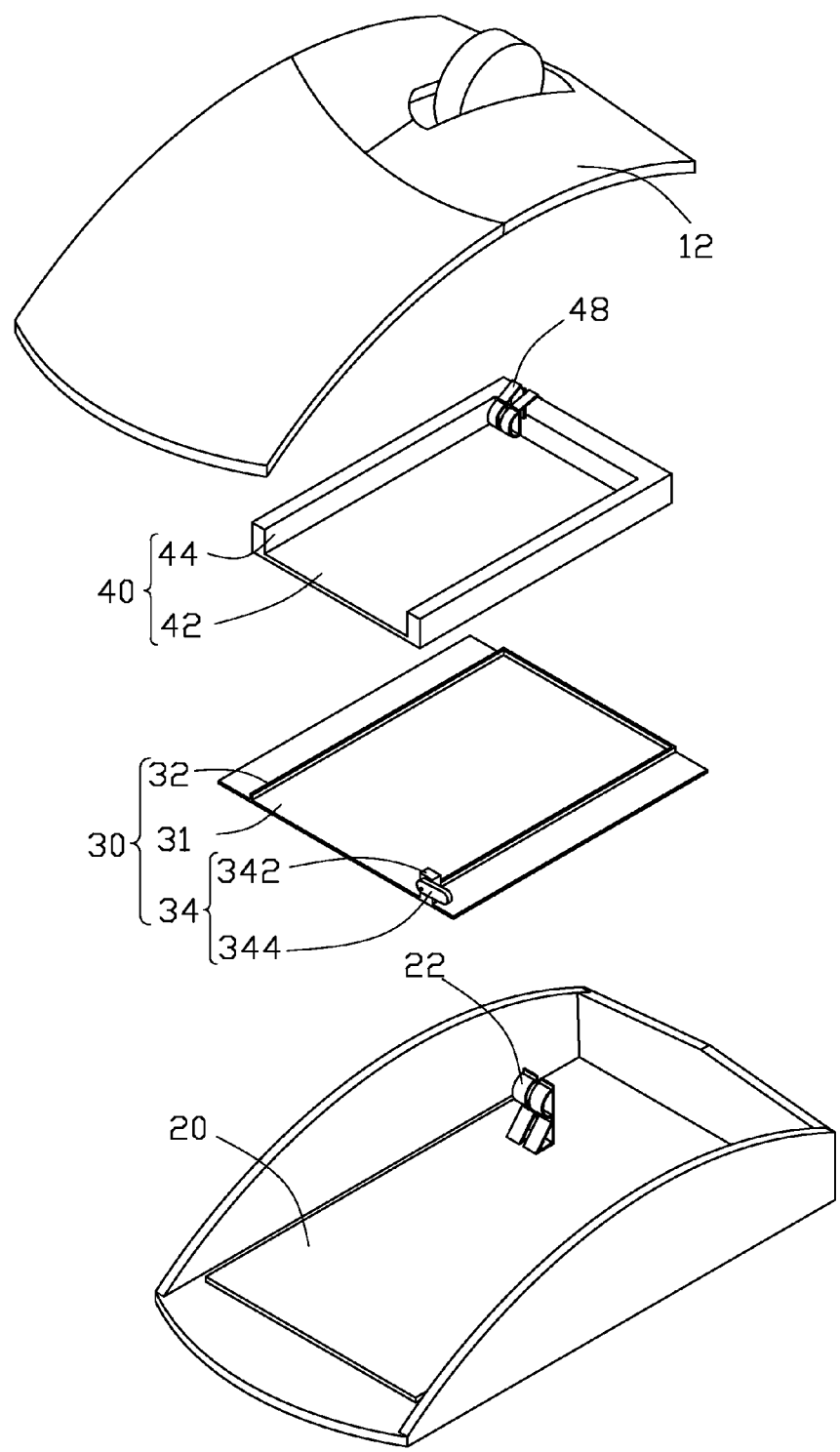
FIG. 2 is another disassembled view of the mouse shown in FIG. 1.
Figure 5:
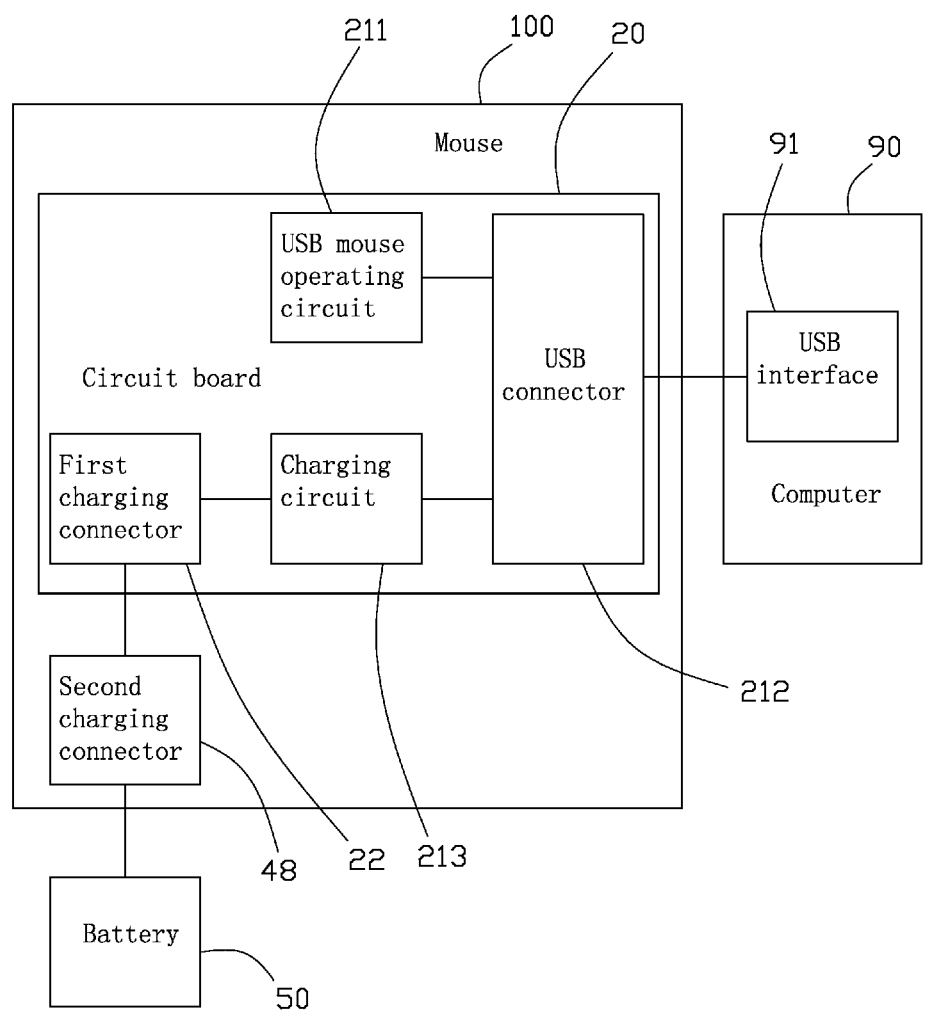
FIG. 5 is a block diagram of connecting the mouse and the battery to a computer to operate the computer and charge the battery.

FIG. 1 and FIG. 2 schematically show a mouse 100, according to an exemplary embodiment in which the mouse 100 is a combination mouse and battery charger. As shown in FIG. 5, the mouse 100 can be connected to a Universal Serial Bus (USB) interface 91 of a computer 90 to operate the computer 90. The mouse 100 includes a housing 10, a circuit board 20, a supporting mechanism 30, and a battery chamber 40. The circuit board 20, the supporting mechanism 30, and the battery chamber 40 are all received in the housing 10.

The housing 10 includes a cover 12 and a main body 14. The cover 12 is a curved panel. The main body 14 includes a base panel 140 and an assembling frame 141. The base panel 140 is a planar board, and the assembling frame 141 is perpendicularly connected to a periphery of the base panel 140. The shape and size of the assembling frame 141 corresponds to the shape and size of the cover 12, such that the cover 12 can be assembled to the assembling frame 141.

The circuit board 20 is mounted on the base panel 140 and is surrounded by the assembling frame 141. The circuit board 20 includes a conventional USB mouse operating circuit 211 and a USB connector 212, and further includes a conventional charging circuit 213 and at least one first charging connector 22. The USB connector 212 can be connected to the USB interface 91 of the computer 90. The USB mouse operating circuit 211 and the charging circuit 213 are both electrically connected to the USB connector 212. The first charging connector 22 is a bent elastic sheet that perpendicularly extends from the top surface of the circuit board 20 and is electrically connected to the charging circuit 213. When the USB connector 212 is connected to the USB interface 91, both the USB mouse operating circuit 211 and the charging circuit 213 can be connected to the computer 90 by the USB connector 212 and the USB interface 91.

The supporting mechanism 30 includes a supporting board 31, a holding frame 32, and a fixing member 34. The supporting board 31 is a planar sheet perpendicularly connected to the assembling frame 14 and positioned parallel with the base panel 140 and the circuit board 20. One side of the supporting board 31 is positioned adjacent to the first charging connector 22. The holding frame 32 is an approximately U-shaped frame formed on the supporting board 31 and opening towards a side of the supporting board 31. The fixing member 34 includes a connecting protrusion 342 and a fixing component 344. The connecting protrusion 342 is formed on the supporting board 31 and positioned adjacent to the opening of the holding frame 32. The fixing component 344 is a bar rotatably mounted on the connecting protrusion 342. The fixing component 344 can be rotated to block the opening of the holding frame 32.

Figure 3:
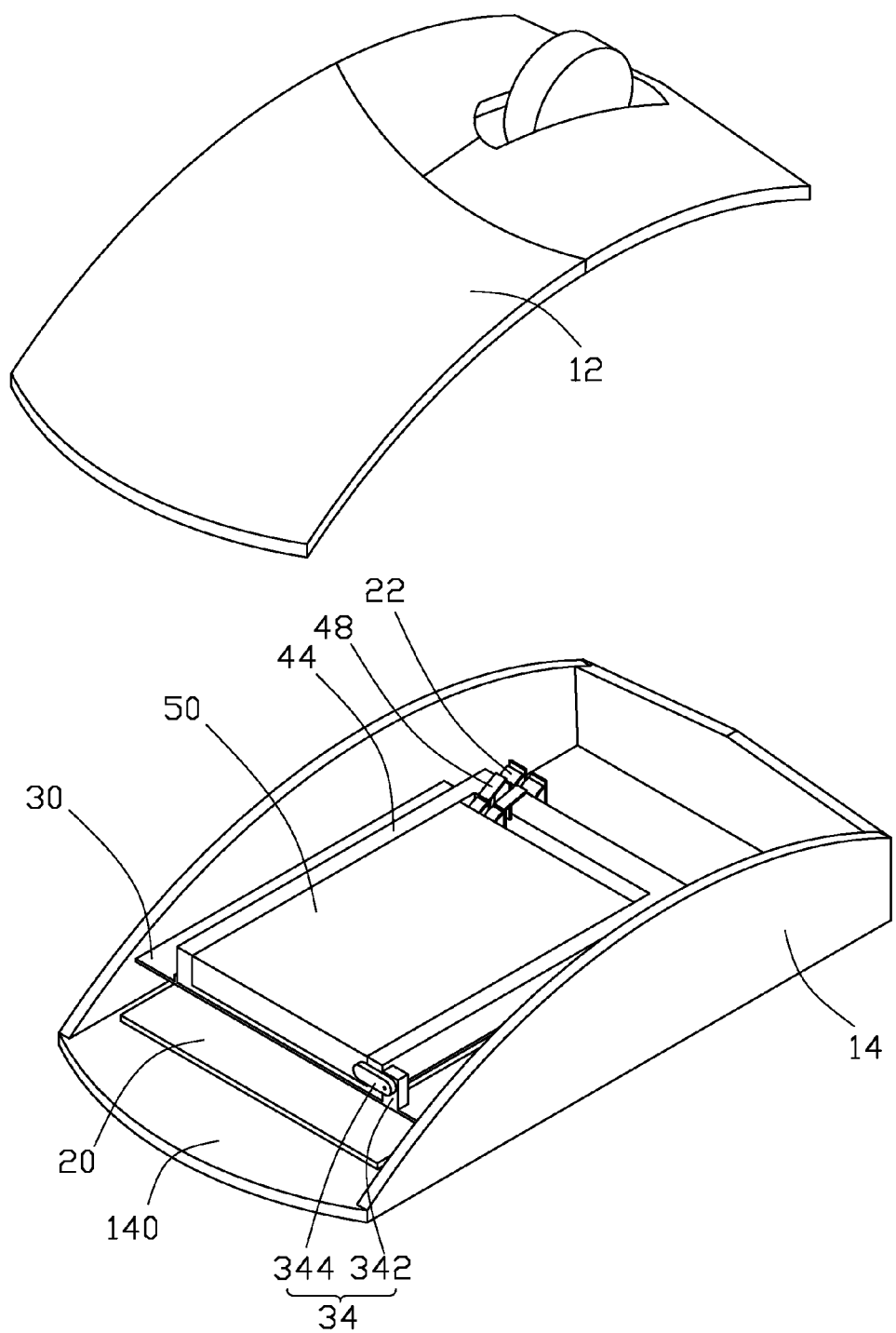
FIG. 3 is a schematic view of connecting a battery with the mouse shown in FIG. 1.
Figure 4:
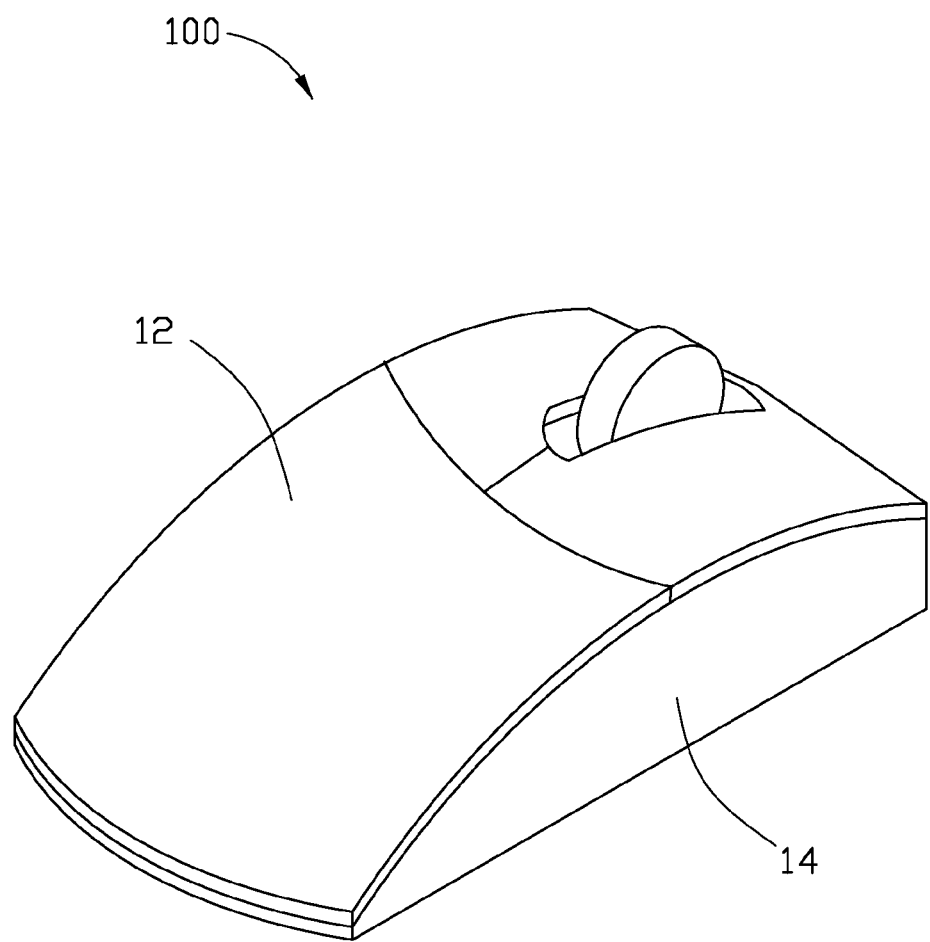
FIG. 4 is an assembled view of the mouse shown in FIG. 1.

The battery chamber 40 includes a battery tray 42, a receiving frame 44, and at least one second charging connector 48. The battery tray 42 is a planar board, which can be received in the holding frame 32. The receiving frame 44 is an approximately U-shaped frame formed on the battery tray 42. Also referring to FIG. 3 and FIG. 4, a battery 50 can be received in the receiving frame 44. The second charging connector 48 is a bent elastic sheet mounted on the receiving frame 44 and configured to correspond to the battery 50 and the first charging connector 22. When the battery 50 is received in the receiving frame 44, the poles of the battery 50 can be electrically connected to the second charging connector 48. When the battery tray 42 is received in the holding frame 32 and the receiving frame 44 and the holding frame 32 are positioned to open towards a same direction, the second charging connector 48 can be electrically connected to the first charging connector 22.

The mouse 100 can be used to operate the computer 90, and can also be used to charge the battery 50 while the mouse 100 is connected to the computer 90. When the mouse 100 is used as a battery charger, the battery tray 42 is received in the holding frame 23. The receiving frame 44 and the holding frame 32 are positioned to open towards a same direction, and the second charging connector 48 contacts the first charging connector 22 and is electrically connected to the first charging connector 22. The battery 50 is then received in the receiving frame 44, and the poles of the battery 50 contact the second charging connector 48 and is electrically connected to the second charging connector 48. The fixing component 344 is rotated to block the receiving frame 44 and the battery 50. Thus, the battery 50 is held in the receiving frame 44, and the battery chamber 40 is held in the holding frame 32. Finally, the cover 12 is assembled to the assembling frame 141.

In use, the assembled mouse 100 with the battery 50 received therein is connected to the computer 90. The USB connector 212 is connected to the USB interface 91, such that the USB mouse operating circuit 211 and the charging circuit 213 are both connected to the USB interface 91. The USB mouse operating circuit 211 can be used to operate the computer 90 by conventional methods. Furthermore, the battery 50 is synchronously connected to the USB interface 91 by the second charging connector 48, the first charging connector 22, and the charging circuit 213. Thus, the computer 90 can charge the battery 50 during operation of the mouse 100.

When the battery 50 is fully charged, the cover 12 is detached from the main body 14, the fixing member 344 is rotated to release the battery chamber 40 and the battery 50. The battery chamber 40 and the battery 50 can be removed together from the opening of the holding frame 32, and the battery 50 is then removed from the battery chamber 40 via the opening of the battery chamber 40. In this way, the first charging connector 22, the second charging connector 48, and the battery 50 can be protected from damages due to friction generated between each other.

Apparently, the mouse 100 can also be used without receiving the battery chamber 40 and/or the battery 50 therein. The supporting mechanism 30 can be integrated with the housing 10.

The mouse 100 can be used to operate the computer 90 as a conventional USB mouse, and can also be used to charge the battery 50 during use. Thus, the mouse 100 is multifunctional and can take full advantage of the USB interface 91 connected thereto.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A mouse, comprising:
   a housing;
   a circuit board received in the housing, the circuit board including a USB mouse operating circuit, a charging circuit and a USB connector, the USB mouse operating circuit and the charging circuit both connected to the USB connector;
   a battery chamber received in the housing and configured for receiving a battery therein, the battery chamber including at least one charging connector connected to the charging circuit; and
   a supporting mechanism connected to the housing, the battery chamber detachably held in the supporting mechanism;
   wherein the charging connector connects the charging circuit with the battery received in the battery chamber.

2. The mouse as claimed in claim 1, wherein the housing includes a cover and a main body, the cover detachably assembled to the main body.

3. The mouse as claimed in claim 1, wherein the supporting mechanism includes a supporting board connected to the housing and a holding frame formed on the supporting board, and the battery chamber is received in the holding frame.

4. The mouse as claimed in claim 3, wherein the supporting mechanism further includes a fixing member, the fixing member including a connecting protrusion formed on the supporting board and a fixing component rotatably mounted on the connecting protrusion, the fixing component holding the battery chamber in the holding frame.

5. The mouse as claimed in claim 4, wherein the battery chamber further includes a battery tray and a receiving frame formed on the battery tray for receiving the battery therein, the charging connector mounted on the receiving frame.

6. The mouse as claimed in claim 5, wherein the fixing component holds the battery received in the receiving frame.

7. The mouse as claimed in claim 5, wherein the circuit board further includes at least one charging connector connected to the charging circuit, and the charging connector of the circuit board is connected to the charging connector of the battery chamber when the battery chamber is held in the holding frame.

8. A mouse connected to a USB interface of a computer for operating the computer, comprising:
   a housing;
   a circuit board received in the housing, the circuit board including a USB mouse operating circuit, a charging circuit and a USB connector, the USB mouse operating circuit and the charging circuit both connected to the USB connector;
   a battery chamber receiving a battery therein and connecting the battery with the charging circuit; and
   a supporting mechanism connected to the housing, the battery chamber detachably held in the supporting mechanism;
   wherein the USB connector is connected to the USB interface for operating the computer by the USB mouse operating circuit, and the computer charges the battery by the USB connector, the charging circuit, and the battery chamber.

9. The mouse as claimed in claim 8, wherein the housing includes a cover and a main body, the cover detachably assembled to the main body.

10. The mouse as claimed in claim 8, wherein the supporting mechanism includes a supporting board connected to the housing and a holding frame formed on the supporting board, and the battery chamber is received in the holding frame.

11. The mouse as claimed in claim 10, wherein the supporting mechanism further includes a fixing member, the fixing member including a connecting protrusion formed on the supporting board and a fixing component rotatably mounted on the connecting protrusion, the fixing component holding the battery chamber in the holding frame.

12. The mouse as claimed in claim 11, wherein the battery chamber includes a battery tray, a receiving frame formed on the battery tray for receiving the battery therein, and at least one charging circuit mounted on the receiving frame and connected the battery received in the receiving frame with the charging circuit.

13. The mouse as claimed in claim 12, wherein the fixing component holds the battery received in the receiving frame.

14. The mouse as claimed in claim 12, wherein the circuit board further includes at least one charging connector connected to the charging circuit, and the charging connector of the circuit board is connected to the charging connector of the battery chamber when the battery chamber is held in the holding frame.

* * * * *